(12) United States Patent
Yang et al.

(10) Patent No.: US 6,753,810 B1
(45) Date of Patent: Jun. 22, 2004

(54) FAST AMBIGUITY RESOLUTION FOR REAL TIME KINEMATIC SURVEY AND NAVIGATION

(75) Inventors: Yunchun Yang, Harbor City, CA (US); Ronald R. Hatch, Wilmington, CA (US); Richard T. Sharpe, Torrance, CA (US)

(73) Assignee: NavCom Technology, Inc., Torrance, CA (US)

( * ) Notice: Subject to any disclaimer, the term of this patent is extended or adjusted under 35 U.S.C. 154(b) by 0 days.

(21) Appl. No.: 10/338,264

(22) Filed: Jan. 7, 2003

Related U.S. Application Data

(63) Continuation-in-part of application No. 10/253,976, filed on Sep. 24, 2002, now abandoned.

(51) Int. Cl.[7] .............................................. H04B 7/185
(52) U.S. Cl. .............................. 342/357.14; 342/357.06
(58) Field of Search .......................... 342/352, 357.01, 342/357.04, 357.06, 357.12; 701/207, 213, 215

(56) References Cited

U.S. PATENT DOCUMENTS

| | | | | | |
|---|---|---|---|---|---|
| 4,963,889 | A | * | 10/1990 | Hatch | 342/357 |
| 5,736,961 | A | * | 4/1998 | Fenton et al. | 342/357 |
| 5,825,326 | A | * | 10/1998 | Semler et al. | 342/357 |
| 5,890,091 | A | * | 3/1999 | Talbot et al. | 701/215 |
| 5,903,236 | A | * | 5/1999 | Lawrence | 342/357 |
| 5,935,194 | A | * | 8/1999 | Talbot et al. | 701/214 |
| 6,127,968 | A | * | 10/2000 | Lu | 342/357.03 |
| 6,150,978 | A | * | 11/2000 | McBurney | 342/357.04 |
| 6,166,683 | A | * | 12/2000 | Hwang | 342/357.04 |
| 6,347,113 | B1 | * | 2/2002 | Hatch | 375/149 |
| 6,373,432 | B1 | * | 4/2002 | Rabinowitz et al. | 342/357.16 |

* cited by examiner

*Primary Examiner*—Dao Phan
(74) *Attorney, Agent, or Firm*—Morgan, Lewis & Bockius LLP

(57) ABSTRACT

A method of fast GPS carrier phase integer ambiguity resolution is based on properties of a Residual Sensitivity Matrix (S matrix), which directly relates a set of integer ambiguities to carrier phase residuals. In one embodiment, the method uses the singular value decomposition of the S Matrix to split the integer ambiguity set into two integer ambiguity subsets and to derive a relationship between the two integer ambiguity subsets. Thus, searching for the integer ambiguity set is reduced to searching for one of the two integer ambiguity subsets, resulting in greatly reduced search space. In an alternative embodiment, a portion of the rows of the S matrix that are linearly independent rows are selected and the S matrix is rearranged according to the selection. The rearranged S matrix is then split into four sub-matrices, which are used to relate the two integer ambiguity subsets.

20 Claims, 3 Drawing Sheets

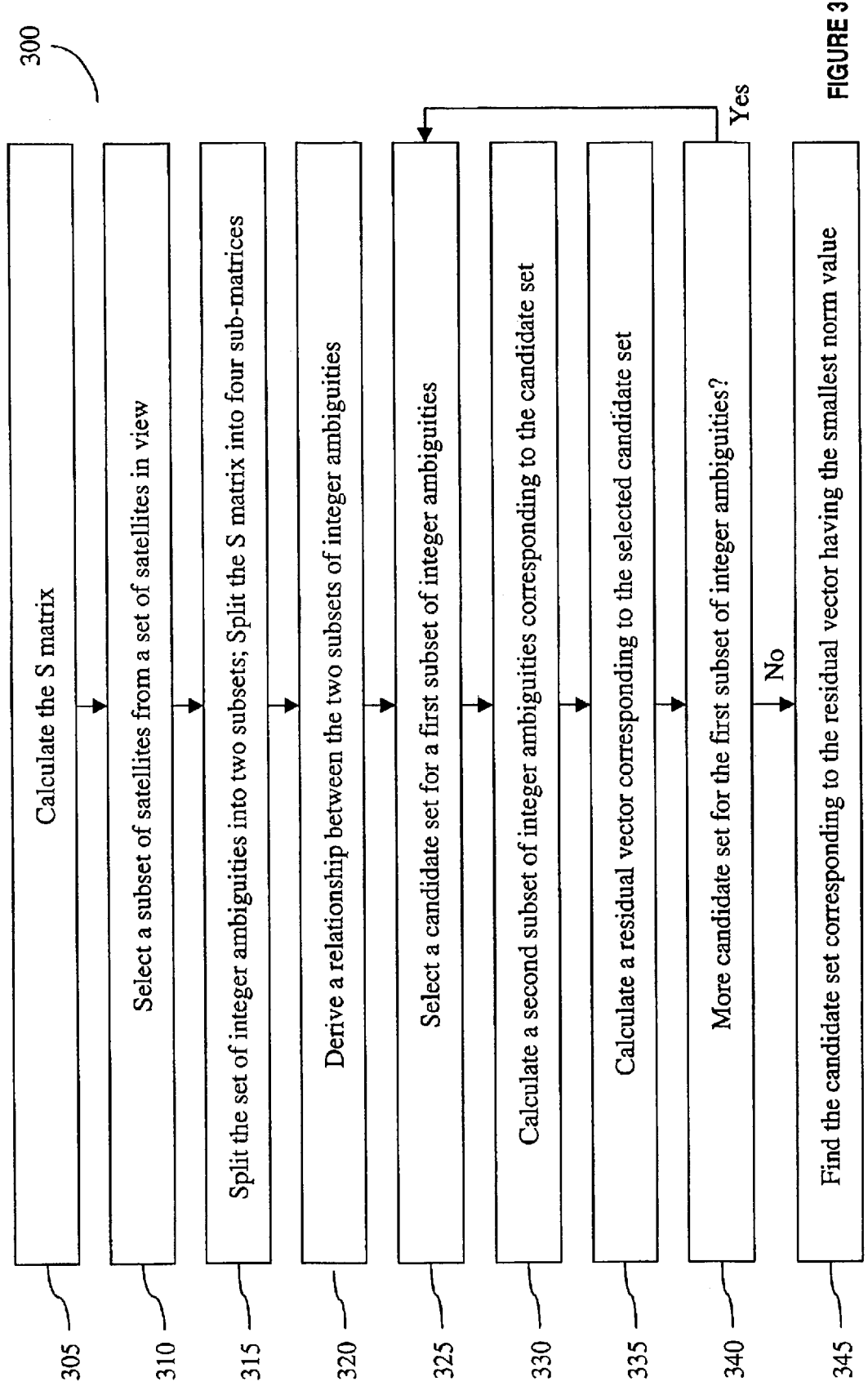

FAST AMBIGUITY RESOLUTION FOR REAL TIME KINEMATIC SURVEY AND NAVIGATION

CROSS REFERENCE TO RELATED APPLICATION

This application is a continuation in part of patent application Ser. No. 10/253,976, filed Sep. 24, 2002 now abandoned.

FIELD OF THE INVENTION

The present invention relates generally to positioning and navigation systems that use the Global Positioning System (GPS), and particularly to carrier phase signal integer ambiguity resolution for high accuracy real-time positioning and navigation with satellite-based navigation systems.

BACKGROUND OF THE INVENTION

Currently, three types of GPS measurements corresponding to each correlator channel with a locked GPS satellite signal are available for civilian GPS receivers. The three types of GPS measurements are pseudorange, Doppler, and integrated carrier phase for two carrier frequencies, L1 and L2. See Farrell, J. A. and Barth, M., *The Global Positioning System and Inertial Navigation*, McGraw-Hill (ISBN-0-07-022045-X), 1999, hereby incorporated by reference. GPS Integer ambiguity resolution is a key issue in high accuracy positioning and navigation using carrier phase measurements. The objective of GPS integer ambiguity resolution is to solve for the integer number of complete carrier cycles during transmission of a GPS signal from the GPS satellite to a receiver, or the difference between the integer number of complete carrier cycles from the GPS satellite to a reference receiver and that from the GPS satellite to a user receiver.

GPS applications, whether they are short range or long range, static positioning or dynamic/kinematic positioning, whether they involve real-time processing or post processing, known or unknown baseline, all require GPS integer ambiguity resolution for high accuracy performance. In practical applications, GPS carrier phase integer ambiguity resolution is usually accomplished in two steps: (1) solving for the integer ambiguity using special search and hypothesis testing techniques; and (2) verifying that the integer ambiguity solution is unique and correct.

Three categories of methods have been developed to solve and validate the integer ambiguity. The first category of methods is based on long duration static observation. These methods are typically used in static mode where the position of the GPS receiver does not change for a long duration of time, so that long time observation data can be used to reduce errors caused by multipath and GPS receiver noise, and to allow the GPS satellites to make significant changes in position during the position determining process. See Remondi, B. W., "*Kinematic and Pseudo-Kinematic GPS*," Proceeding of the Satellite Division of the Institute of Navigation First International Technical Meeting, Colorado Springs, Colo., Sep. 21–23, 1988, hereby incorporated by reference.

The second category of methods requires special moving of GPS antennae, such as GPS antennae swapping as described by Remondi, B. W., "*Performing Centimeter-Level Surveys in Seconds with GPS Carrier Phase: Initial Results*," Journal of The Institute of Navigation, Vol. 32, No. 4, Winter 1985–1986, hereby incorporated by reference. Swapping location of two antennae causes rapid change in the observability of the GPS receiver position, but is rarely possible in real-time kinematic applications.

The above two categories of methods are straightforward but require special assumptions and conditions that may not be practical for specific applications. The third category of methods includes searching methods that require fewer assumptions, such as:

the ambiguity function method described by Counselman, C. and Gourevitach S., "*Miniature Intergerometer Terminals for Earth Surveying: Ambiguity and Multipath with the Global Position System*," IEEE Transactions on Geoscience and Remote Sensing, GE-19(4): 244–252, 1981;

the fast ambiguity resolution approach described by Frei, E. and G. Beutler, "*Rapid Static Positioning Based on the Fast Ambiguity Resolution Approach FARA: Theory and First Results*," Manuscripts Geodaetia, 1990, pp.325–356;

the least squares ambiguity search technique described by Hatch, R. R., "*Instantaneous Ambiguity Resolution*," Kinematic Systems in Geodesy, Surveying and Remote Sensing, IAG Symposia 107, Springer Verlag, N.Y., September, 1990, pp. 299–308, and by Farrell, J. A. and Barth, M, supra;

the Cholesky decomposition method in Landau, H. and Euler, H. J., "*On-The-Fly Ambiguity Resolution for Precise Differential Positioning*," Processing of ION GPS-92, Albuquerque, N.Mex., 16–18 Sep., 1992, pp. 607–613;

the fast ambiguity search filter described by Chen, D., "*Fast Ambiguity Search Filter (FASF): A Novel Concept from GPA Ambiguity Resolution*," Processing of the ION GPS-93, Salt Lake City, Utah, Sep. 22–24, 1993, pp. 781–787; and the least squares ambiguity decorrelation adjustment method by Teunissen, P. J. G., "*A New Method for Fast Carrier Phase Ambiguity Estimation*," Proceedings IEEE Position Location and Navigation Symposium PLAN94, Las Vegas, 11–15 Apr., 1994, pp. 562–573.

All of the publications cited above are hereby incorporated by reference as background information.

Searching methods for solving integer ambiguity in GPS applications face many issues, including linear stochastic model definition, ambiguity resolution initialization, search space reduction, state and standard deviation calculation in the search space, and validation and rejection criteria for the unique and correct candidate. Among these, search space reduction is critically important. The purpose of search space reduction is to reduce the number of integer candidates (or the size of a search space) for the carrier phase integers without missing the correct candidates. The size of the search space not only affects how fast an ambiguity resolution method solves for the carrier phase integers (i.e., the carrier phase integer for each GPS signal), but also determines the success rate of the ambiguity resolution method. Usually, the smaller the search space, the easier it is to find a unique and correct candidate set for the carrier phase integers.

One approach to reduce the search space is to decrease diagonal element values of a covariance matrix that determines the search space. See Teunissen, P. J. G., supra. Existing methods to decrease diagonal element values of the covariance matrix include: improving the GPS receiver measurement performance; in a dual frequency GPS receiver, combining L1 and L2 measurements to suppress pseudorange measurement noise, or using phase smoothing code (such as a Hatch filter) to reduce the measurement noise; and applying an integer inverse matrix transformation to decorrelate the double differential measurement and to reduce integer ambiguity covariance element values.

Another approach to reduce the search space is to increase the length of the search steps by using a longer wavelength (e.g., by combining the L1 and L2 phases). However, using a longer wavelength usually means increased measurement noise.

Furthermore, the search space can be greatly reduced by cutting search dimensions determined by the number of satellites used for GPS measurements. Cutting the search dimensions can greatly reduce the number of searching candidates. For example, if each search range includes 10 search cycles, to resolve the ambiguities of four carrier phase integers the total number of candidate sets for the four carrier phase integers is $10^4$, while to resolve the ambiguities of seven carrier phase integers, the total number of candidate sets is $10^7$. Therefore, in some search methods, the differential GPS measurements are partitioned into a primary measurement set and a secondary measurement set. The phase measurements of the primary set define the reduced search space, while the phase measurements of the secondary set are used to verify the correctness of the resolved candidates. See Hatch, R. R., "*Instantaneous Ambiguity Resolution*," Supra.

SUMMARY OF THE INVENTION

The present invention includes a method of fast GPS carrier phase integer ambiguity resolution, based on properties of a Residual Sensitivity Matrix (S matrix), which directly relates a set of integer ambiguities to carrier phase residuals. In one embodiment of the present invention, the method uses the Singular Value Decomposition of the S Matrix to split the integer ambiguity set into two integer ambiguity subsets and to derive a relationship between the two integer ambiguity subsets. Thus, searching for the integer ambiguity set is reduced to searching for one of the two integer ambiguity subsets, resulting in a greatly reduced search space. In an alternative embodiment of the present invention, splitting the integer ambiguity set into two integer ambiguity subsets and deriving a relationship between the two integer ambiguity subsets are accomplished by selecting a portion of the rows of the S matrix as linearly independent rows of the S matrix and rearranging the S matrix according to the selection. The rearranged S matrix is then split into four sub-matrices, which are used to relate the two integer ambiguity subsets.

The searched integer ambiguity subset can be selected from the integer ambiguity set based on, or taking into consideration, the satellite geometry and measurement residuals. As a result, the method of the present invention not only improves the calculation efficiency and ambiguity resolution time, but also improves the reliability of the search result.

BRIEF DESCRIPTION OF THE DRAWINGS

Additional objects and features of the invention will be more readily apparent from the following detailed description and appended claims when taken in conjunction with the drawings, in which:

FIG. 3 is a flow chart illustrating a method of integer ambiguity resolution according to an alternative embodiment of the present invention.

DESCRIPTION OF THE INVENTION

Figure 1:
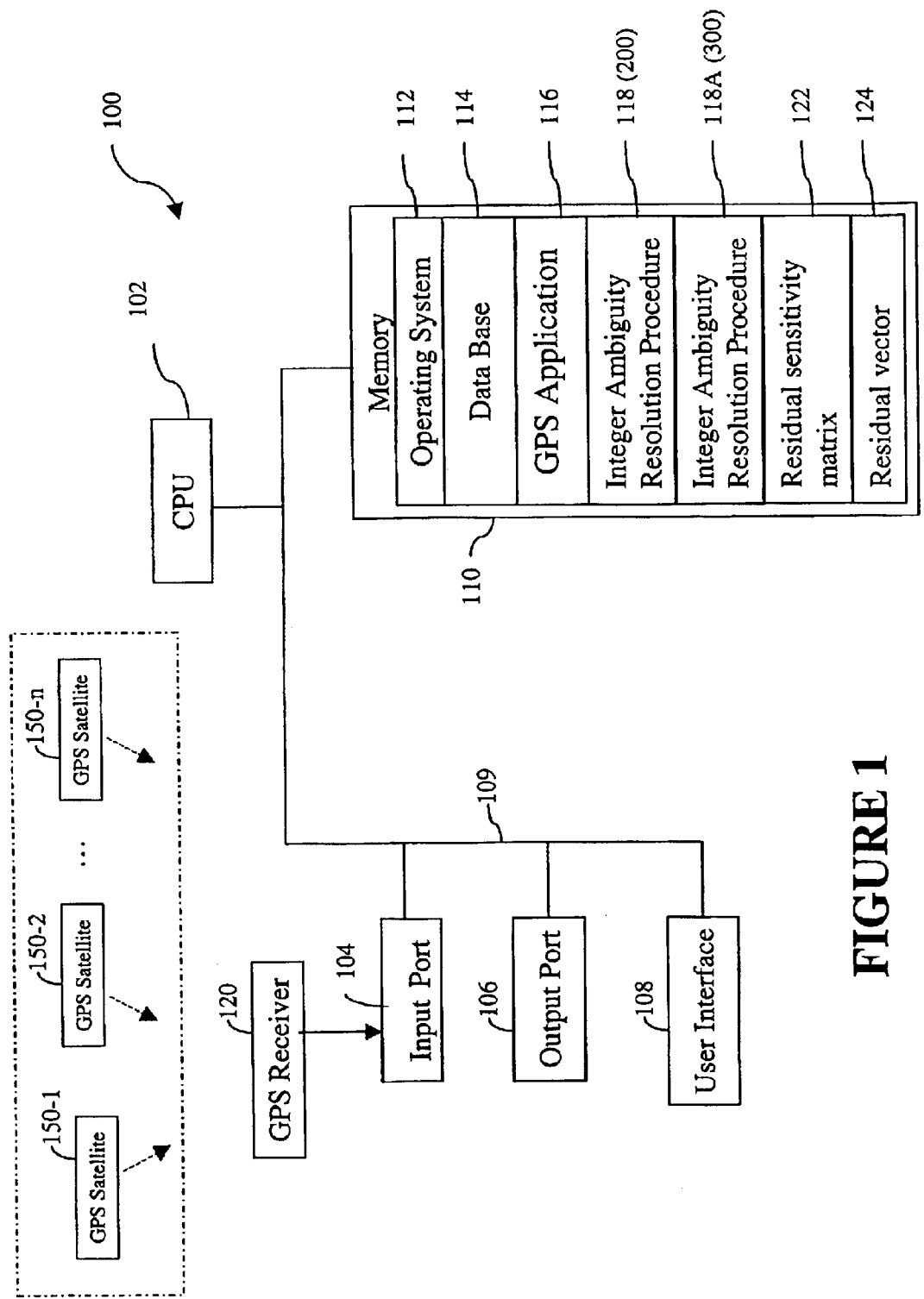
FIG. 1 is a block diagram of a computer system that can be used to carry out the method of the present invention according to one embodiment of the present invention.

Differential operations are typically used in GPS applications to cancel the noise factors in carrier phase measurements resulting from common mode errors. Differential GPS measurements typically involve a base reference GPS receiver ($GPS_B$), a rover GPS receiver ($GPS_R$), and a communication mechanism between the $GPS_B$ and the $GPS_R$. The differential GPS carrier phase measurement equation can be written as:

$$\nabla \phi \lambda = [h - \lambda] \cdot \begin{bmatrix} x \\ N \end{bmatrix} + n_\phi \qquad (1)$$

where $\nabla \phi$ is the differential carrier phase measurement between the $GPS_R$ and the $GPS_B$, $\lambda$ is the wavelength of the carrier phase, h is a user-to-satellite vector, x is a real unknown state vector (or real vector), N is the integer ambiguity, and $n_\phi$ represents noise factors in the differential carrier phase measurement. For single-difference measurement methods, where differences in GPS measurements with respect to each satellite are taken between $GPS_R$ and $GPS_B$, $\nabla \phi = \Delta \phi_{BR}^i$, h=$[h^i 1]$, x=$[x_{BR} \; c\Delta t_r^{BR}]$, N=$N_{BR}^i$, and $n_\phi = n_{\phi BR}^i$, where i refers to the ith satellite, $\Delta \phi_{BR}^i$ is a differential phase measurement with respect to an $i^{th}$ satellite, $h^i$ is a unit vector from the $i^{th}$ satellite to $GPS_R$, $x_{BR}$ is a position vector from $GPS_B$ to $GPS_R$, c is the speed of light, $\Delta t_r^{BR}$ is the difference in receiver clock bias between $GPS_R$ and $GPS_B$, $N_{BR}^i$ is a differential integer ambiguity between $GPS_B$ and $GPS_R$ with respect to the $i^{th}$ satellite, and $n_{\phi BR}^i$ is called differential carrier phase noise representing the difference between the carrier phase noise at $GPS_B$ and that at $GPS_R$ with respect to the $i^{th}$ satellite. The carrier phase noise can come from many factors, including carrier phase multipath error, receiver range tracking error, receiver phase tracking error, satellite clock errors, tropospheric delay, and errors in the broadcast ephemeris data. Among these error factors, common errors experienced by both $GPS_R$ and $GPS_B$, such as satellite clock errors, tropospheric delay, and errors in the broadcast ephemeris data, can be canceled by using differential carrier phase measurements.

Similarly, for double-difference measurement methods, where single-difference measurements with respect to a common satellite are subtracted from corresponding measurements with respect to all other satellites in order to remove receiver clock bias, $\nabla \phi = \nabla \Delta \phi_{BR}^{ij}$, h=$h^i - h^j$, x=$x_{BR}$, N=$N_{BR}^{ij}$, and $n_\phi = n_{\phi BR}^{ij}$, where $\Delta \phi_{BR}^{ij}$ is the differential phase measurement with respect to the $i^{th}$ satellite subtracted from the differential phase measurement with respect to the $j^{th}$ satellite, $N_{BR}^{ij}$ is the differential integer ambiguity between $GPS_B$ and $GPS_R$ with respect to the $i^{th}$ satellite subtracted from the differential integer ambiguity between $GPS_B$ and $GPS_R$ with respect to the $j^{th}$ satellite, and $n_{\phi BR}{}^{ij}$ is the differential carrier phase noise with respect to the $i^{th}$ satellite subtracted from the differential carrier phase noise with respect to the $j^{th}$ satellite.

Equation (1) cannot be solved directly because there are (4+n) unknown variables for n single-difference GPS carrier phase measurements, and (3+n) unknown variables for n double-difference GPS carrier phase measurements, where n is the number of satellites with respect to which measurements are taken. In addition, Equation (1) cannot be used directly as a linear measurement model to estimate the real vector x and the integer ambiguity N by common methods, such as the conventional Least Square Method and Kalman Filter, because N is an integer. Therefore, a non-linear method would need to be used to resolve the integer ambiguity N before solving for the real vector x.

The present invention provides a novel method of resolving the integer ambiguity N by reducing the search space for the integer ambiguity using special properties of a Residual Sensitivity Matrix. For case of discussion, single-difference measurements are used below to describe an embodiment of the present invention. Those skilled in the art will recognize that similar descriptions apply to all other types of measurements. In one embodiment of the present invention, for each satellite, Equation (1) can be written as:

$$(\nabla \phi + N)\lambda = hx + n_\phi.$$

When measurements are taken with respect to n satellites in view of a GPS receiver, all of the measurements can be written in array format as:

$$(\nabla \Phi + N)\lambda = Hx + n_\phi \quad (2)$$

where $\nabla \Phi = [\nabla \phi_1 \ \nabla \phi_2 \ \ldots \ \nabla \phi_n]^T$, with $\nabla \phi_i = \Delta \phi_{BR}{}^i$, is a carrier phase vector formed by the differential carrier phase measurement with respect to each of the n satellites, $N = [N_1 \ N_2 \ \ldots \ N_n]^T$, with $N_i = N_{BR}{}^i$, is an integer ambiguity vector formed by the differential integer ambiguity with respect to each satellite. $H = [h_1 \ h_2 \ \ldots \ h_n]^T$, with $h_i = h^i$ is a measurement vector matrix formed by the unit vector from $GPS_R$ to each of the n satellites, and $n_\phi = [n_{\phi_1} \ n_{\phi_2} \ \ldots \ n_{\phi_n}]^T$, with $n_{\phi_i} = n_{\phi BR}{}^i$, is a measurement noise vector (or phase range residual vector) formed by the differential carrier phase noise with respect to each of the n satellites.

An initial integer ambiguity vector $\hat{N}_0$ can be estimated by rounding off the pseudorange or carrier phase smoothed pseudorange measurements made by a GPS receiver. A more accurate integer ambiguity vector N can be generated by searching around the initial integer ambiguity vector $\hat{N}_0$ based on a search width for each satellite for which a pseudorange integer is included in the ambiguity vector. For example, if the search width for each satellite is $\delta N$, the total number of candidate sets for the integer ambiguity vector N is $(\delta N)^{n-1}$, with n being the number of satellites used. So, when $\delta N = 4$ and $n = 7$, the total number of candidate sets is 4096 (i.e., $4^{7-1}$). Using $\hat{N}_0$, each candidate set for N can be written in vector form as $$\hat{N} = [\hat{N}_1 \ \hat{N}_2 \ \ldots \ \hat{N}_n]^T = \hat{N}_0 + \Delta N,$$

where $\Delta N = [\Delta N_1 \ \Delta N_2 \ \ldots \ \Delta N_n]^T$ ($\Delta N_i \leq \delta N$) is a candidate offset vector representing the difference between a candidate set vector $\hat{N}$ and the initial integer ambiguity vector $\hat{N}_0$. A solution for the real vector x corresponding to the candidate set vector $\hat{N}$ can be expressed as $$\hat{x} = [H^T R H]^{-1} H^T R^{-1} (\nabla \Phi + \hat{N}_0 + \Delta N)\lambda \quad (3)$$

where $$R = \begin{bmatrix} \sigma_1^2 & \cdots & 0 \\ \vdots & \ddots & \vdots \\ 0 & & \sigma_n^2 \end{bmatrix} \quad (4)$$

is a measurement covariance matrix formed by $\sigma_i$, which is a standard deviation of the differential carrier phase noise $n_{\phi_i}$ calculated using conventional methods. An example of the methods for calculating $\sigma_i$ can be found in "*Precision, Cross Correlation, and Time Correlation of GPS Phase and Code Observations,*" by Peter Bona, GPS Solutions, Vol. 4, No. 2, Fall 2000, p. 3–13, or in "*Tightly Integrated Attitude Determination Methods for Low-Cost Inertial Navigation: Two-Antenna GPS and GPS/Magnetometer,*" by Yang, Y., Ph.D. Dissertation, Dept. of Electrical Engineering, University of California, Riverside, Calif. June 2001, both hereby incorporated by reference.

From Equation (2), a calculated phase range residual vector $\Delta_\Phi$ corresponding to candidate set $\hat{N}$ is:

$$\Delta_\Phi = (\nabla \Phi + \hat{N}_0 + \Delta N)\lambda - H\hat{x} = [I - H(H^T R^{-1} H)^{-1} H^T R](\nabla \Phi + \hat{N}_0 + \Delta N)\lambda = S(\nabla \Phi + \hat{N}_0 + \Delta N)\lambda \quad (5)$$

where $$S = I - H[H^T R^{-1} H]^{-1} H^T R^{-1} \quad (6)$$

is the residual sensitivity matrix (S matrix), as defined by Hatch, R. R. and Sharpe, T., in "A Computationally Efficient Ambiguity Resolution Technique," Proceedings of ION GPS 2001, Salt Lake City, Utah, USA, 11–14 Sep. 2001, which is hereby incorporated by reference.

From Equations (3)–(6), an estimated phase standard deviation for the candidate set $\hat{N}$ can be expressed as:

$$\sigma_{\Phi | \hat{N}} = \sqrt{\frac{\Delta_\Phi^T \Delta_\Phi}{n - k}} \quad (7)$$

with k being a real state number of the real vector x. Regardless of the number, n, of satellite pseudorange measurements being used, k is equal to 4 for single differential GPS measurements, and is equal to 3 for double differential GPS measurements.

Thus, the ambiguity search is to find the unique and correct candidate set with smallest $\sigma_{\Phi | \hat{N}}$. Since $\Delta_\Phi$ is a vector, $\sigma_{\Phi | \hat{N}}$ can be minimized by minimizing the absolute value of each term of $\Delta_\Phi$, or by minimizing the norm value of $\Delta_\Phi$.

Let $$\Delta_{\Phi 0} = S(\nabla \Phi + \hat{N}_0)\lambda$$

be an initial phase range residual vector corresponding to the initial integer ambiguity vector. From Equation (5), minimizing the absolute value of each term of $\Delta_\Phi$ is equivalent to finding a candidate offset vector $\Delta N$ such that $$\Delta N = \text{round}(\Delta N_f)$$

and $$\Delta_{\Phi 0} + S \Delta N_f \lambda = 0, \quad (8)$$

or $$S\Delta N_f = -\Delta_{\Phi 0}\frac{1}{\lambda} = -Q_0, \quad (9)$$

where $Q_0$ is the initial phase range residual vector in units of carrier wave cycles.

The S matrix has many interesting properties: it is symmetric and positively semi-definite, and it has a zero sum for each row and column $$\left(\sum_{i=1}^{n} s_{ij} = 0, \sum_{j=1}^{n} s_{ij} = 0\right).$$

Additionally, the S matrix is idempotent, i.e., $S=SS=SSS=\ldots=S^l$, with l being any positive integer, and the rank of the S matrix is equal to n–k, i.e., rank(S)=n–k, where k=4 for single differential GPS and k=3 for double differential GPS. These properties of the S matrix can be used to reduce the search space, as described below.

In one embodiment of the present invention, since the S matrix is not a full rank matrix, S can be expressed as the product of three matrices, U, X, and V, using singular value decomposition (SVD), i.e., $$S = UXV^T, \quad (10)$$

where U and V are full rank matrices, $U = [u_1 \ u_2 \ \ldots \ u_n]$,
$V = [v_1 \ v_2 \ \ldots \ v_n]$, with $u_i = [u_{i1}, u_{i2} \ldots u_{in}]^T$ and $v_i = [v_{i1} \ v_{i2} \ldots v_{in}]^T$ (i=1, 2, ..., n) being orthonormal vectors, i.e., $u_i^T u_i = 1$, $u_i^T u_j = 0$, $v_i^T v_i = 1$, and $v_i^T v_j = 0$ (i≠j). Also one of the solutions of V is a combination of the eigenvector of S, i.e., $v_i$ (i=1, 2, ..., n) are all eigenvectors of S. Since the eigenvalues of S are either 1 or 0, its eigenvectors are all real vectors.

Furthermore, X can be expressed as $$X = \begin{bmatrix} s_1 & \ldots & 0 & \\ \vdots & \ddots & \vdots & 0_{(n-4)\times 4} \\ 0 & \ldots & s_{n-4} & \\ & 0_{4\times(n-4)} & & 0_{4\times 4} \end{bmatrix}$$

where $s_1 = \ldots = s_{n-4} = 1$, and $0_{i\times j}$ are i by j matrices (where i,j=4 or n–4) with all zero elements.

Thus, Equation (9) becomes:

$$UXV^T \Delta N_f = -Q_0,$$

or, $$XV^T \Delta N_f = -U^T Q_0 = Q_1, \quad (11)$$

or, $$\begin{bmatrix} s_1 v_1^T \\ \vdots \\ s_{n-4} v_{n-4}^T \\ 0_{4\times n} \end{bmatrix} \Delta N_f = Q_1. \quad (12)$$

Equation (12) can be re-written as $$\begin{bmatrix} A_1 & A_2 \\ 0_{4\times(n-4)} & 0_{4\times 4} \end{bmatrix} \begin{bmatrix} N_{1f} \\ N_{2f} \end{bmatrix} = \begin{bmatrix} Q_{11} \\ Q_{12} \end{bmatrix}, \quad (13)$$

or, $$A_1 N_{1f} + A_2 N_{2f} = Q_{11}, \quad (14)$$

or, $$N_{1f} = A_1^{-1}(Q_{11} - A_2 N_{2f}) \quad (15)$$

where $$A_1 = \begin{bmatrix} s_1 v_{11} & s_1 v_{12} & \ldots & s_1 v_{1(n-4)} \\ s_2 v_{21} & s_2 v_{22} & \ldots & s_2 v_{2(n-4)} \\ \vdots & \vdots & \ldots & \vdots \\ s_{n-4} v_{(n-4)1} & s_{n-4} v_{(n-4)2} & & s_{(n-4)} v_{(n-4)(n-4)} \end{bmatrix}, \quad (16)$$

$$A_2 = \begin{bmatrix} s_1 v_{1(n-3)} & s_1 v_{1(n-2)} & s_1 v_{1(n-1)} & s_1 v_{1n} \\ s_2 v_{2(n-3)} & s_2 v_{2(n-2)} & s_2 v_{2(n-1)} & s_2 v_{2n} \\ \vdots & \vdots & \vdots & \vdots \\ s_{n-4} v_{1(n-4)(n-3)} & s_{n-4} v_{(n-4)(n-2)} & s_{n-4} v_{(n-4)(n-1)} & s_{n-4} v_{(n-4)n} \end{bmatrix}, \quad (17)$$

$$Q_{11} = \begin{bmatrix} u_{11}\Delta_{\Phi 01} + u_{12}\Delta_{\Phi 02} + \ldots + u_{1n}\Delta_{\Phi 0n} \\ u_{21}\Delta_{\Phi 01} + u_{22}\Delta_{\Phi 02} + \ldots + u_{2n}\Delta_{\Phi 0n} \\ \ldots \\ u_{(n-4)1}\Delta_{\Phi 01} + u_{(n-4)2}\Delta_{\Phi 01} + \ldots + u_{(n-4)n}\Delta_{\Phi 0n} \end{bmatrix} \Big/ \lambda \quad (18)$$

$$Q_{12} = \begin{bmatrix} u_{(n-3)1}\Delta_{\Phi 01} + u_{(n-3)2}\Delta_{\Phi 02} + \ldots + u_{(n-3)n}\Delta_{\Phi 0n} \\ u_{(n-2)1}\Delta_{\Phi 01} + u_{(n-2)2}\Delta_{\Phi 02} + \ldots + u_{(n-2)n}\Delta_{\Phi 0n} \\ \ldots \\ u_{n1}\Delta_{\Phi 01} + u_{n2}\Delta_{\Phi 01} + \ldots + u_{nn}\Delta_{\Phi 0n} \end{bmatrix} \Big/ \lambda \quad (19)$$

$$N_{1f} = [\Delta N_{1f} \ \Delta N_{2f} \ \ldots \ \Delta N_{(n-4)f}], \quad (20)$$

and $$N_{2f} = [\Delta N_{(n-3)f} \ \Delta N_{(n-2)f} \ \Delta N_{(n-1)f} \ \Delta N_{nf}]. \quad (21)$$

Equations 8 through 21 show that the integer ambiguity candidate offset vector $\Delta N = [\Delta N_1 \ \Delta N_2 \ \ldots \ \Delta N_n]^T$ can be separated into two related sub-vectors, $\Delta N_1 = \text{round}(N_{1f})$, and $\Delta N_2 = \text{round}(N_{2f})$, where $\Delta N_1 = [\Delta N_1 \ \Delta N_2 \ \ldots \ \Delta N_{n-4}]^T$ and $\Delta N_2 = [\Delta N_{n-3} \ \Delta N_{n-2} \ \Delta N_{n-1} \ \Delta N_n]^T$. Therefore, instead of searching for $\Delta N$ which includes integer ambiguities associated with n satellites (150, see FIG. 1), using the present application a GPS application only needs to search for $\Delta N_2$. With each selection of $\Delta N_2$, the corresponding $\Delta N_1$ can be derived using Equation 15, as shown in the following.

$$\Delta N_1 = \text{round}(A_1^{-1}(Q_{11} - A_2 \Delta N_2)). \quad (22)$$

Substituting $\Delta N_1$ and $\Delta N_2$ into Equation (14) yields $$Q = Q_{11} - (A_1 \Delta N_1 + A_2 \Delta N_2), \quad (23)$$

which is a residual vector corresponding to integer ambiguity offset sub-vectors $\Delta N_1$ and $\Delta N_2$. Minimizing the norm value of the residual vector Q in equation 23, by selecting the candidate among the first subset of integer ambiguities (corresponding to $\Delta N_1$) for which the residual vector Q has the smallest norm value, is equivalent to minimizing the norm value of the calculated phase range residual vector, $\Delta_\Phi$.

$\Delta N_2$ includes integer ambiguities associated with k satellites, where k=4 for single differential GPS and k=3 for double differential GPS. For single differential GPS, the ambiguity value of one satellite measurement is arbitrary since it affects the clock offset only and not the position states. Therefore, for both single and double differential GPS applications, only 3 integers need to be searched. The rest of the pseudorange integers can be derived using Equation 15 as shown above. For example, for a search width $\delta N=4$, if $n=7$, the total number of candidate sets to be searched is $4^3=64$. Compared with the total number of candidate sets of $4^6=4096$ in prior art methods, the present invention reduces by almost two orders of magnitude the number of integer ambiguity candidate sets in the search space.

Figure 2:
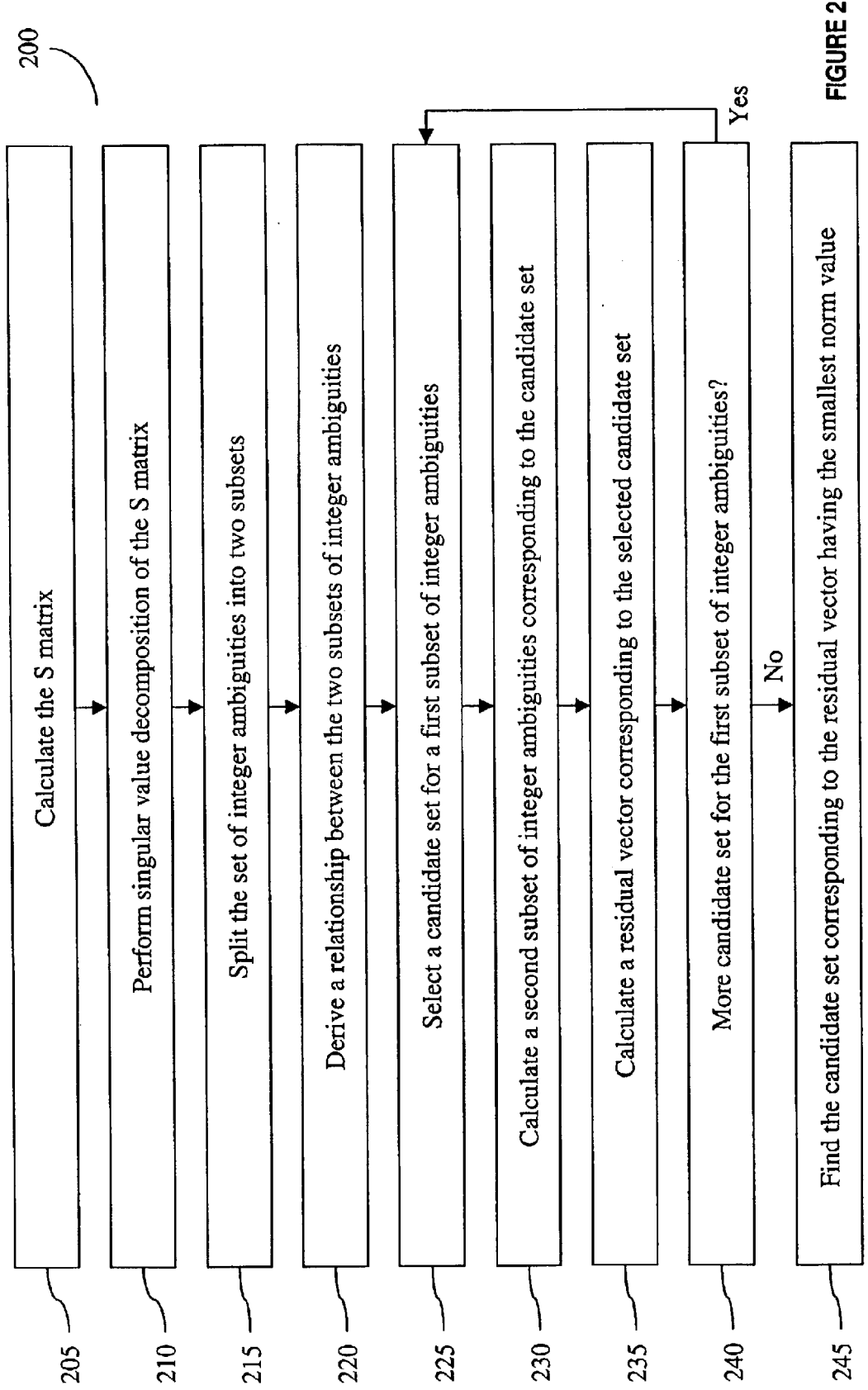
FIG. 2 is a flow chart illustrating a method of integer ambiguity resolution according to one embodiment of the present invention.

FIG. 2 is a flow chart of a method 200 of resolving a set of GPS carrier phase integer ambiguities, in accordance with one embodiment of the present invention. The method begins with calculating 205 the S matrix, performing 210 singular value decomposition of the S matrix, splitting 215 the set of integer ambiguities into two subsets, and deriving 220 a relationship between the two subsets of integer ambiguities. A first subset of the integer ambiguities is selected 225 among a plurality of candidate subsets. For each of the plurality of candidate subsets (see steps 230 through 240), the method includes calculating 230 a second subset of integer ambiguities corresponding to the candidate subset using the derived relationship (from step 220) between the two subsets of integer ambiguities, and calculating 235 a residual vector corresponding to candidate subset. The method then proceeds to find the candidate subset corresponding to the residual vector Q having the smallest norm value as the solution for the first subset of integer ambiguities ($\Delta N_2$) (step 245). The solution for the second subset of integer ambiguities ($\Delta N_1$) is the calculated second subset of integer ambiguities corresponding to the solution for the first subset of integer ambiguities.

Referring to FIG. 1, the method of FIG. 2 can be carried out by a microprocessor-based computer 100 coupled to a GPS receiver 120, or by other types of computer systems. FIG. 1 shows a block diagram of an exemplary computer system 100 for carrying out the methods of the present invention. In some embodiments, the GPS receiver 120 and the computer system 100 are integrated into a single device, within a single housing, such as a portable, handheld or even wearable position tracking device, or a vehicle-mounted or otherwise mobile positioning and/or navigation system. In other embodiments, the GPS receiver 120 and the computer system 100 are not integrated into a single device.

System 100 comprises a central processing unit (CPU) 102, memory 110, input 104 and output ports 104, 106, and (optionally) a user interface 108, coupled to each other by one or more communication buses 109. The memory 110 may include high-speed random access memory and may include nonvolatile mass storage, such as one or more magnetic disk storage devices. Memory 110 may include mass storage that is remotely located from the central processing unit 102. The memory 10 preferably stores an operating system 112, a database 114, and GPS application procedures 116, including an integer pseudorange ambiguity resolution procedure 118 for implementing the integer ambiguity method of the present invention. The operating system 112 and application programs and procedures 116 stored in memory 110 are for execution by the CPU 102 of the computer system 100. The memory 110 preferably also stores data structures used during execution of the GPS application procedures 116, including the residual sensitivity matrix S 122 and the residual vector Q 124, as well as other data structures discussed in this document.

The input port 104 is for receiving data from a GPS receiver 120, and output port 106 can be used for outputting calculation results. Alternately, calculation results may be shown on a display device of the user interface 108.

The operating system 112 may be, but is not limited to, the embedded operating system, UNIX, Solaris, or Windows 95, 98, NT 4.0, 2000 or XP. More generally, operating system 112 has procedures and instructions for communicating, processing, accessing, storing arid searching data.

Method 200 of the present invention requires matrix calculation involving singular value decomposition. In an alternative embodiment of the present invention, the search space reduction method of the present invention can be carried out using less complicated matrix calculations, as described below.

Multiplying both sides of Equation 9 with the S matrix and using the equal idempotent property of the S matrix, we have $$S \Delta N = -S Q_0, \quad (24)$$

or, $$S(\Delta N + Q_0) = 0. \quad (25)$$

Since the rank of S is (n−4), only (n−4) rows of the S matrix are linearly independent. Selecting (n−4) independent rows and rearranging the S with the selected (n−4) rows being the first (n−4) rows, Equation 23 can be rewritten as $$\begin{bmatrix} S_{11} & S_{12} \\ S_{21} & S_{22} \end{bmatrix} \begin{bmatrix} \Delta N_1 + Q_{01} \\ \Delta N_2 + Q_{02} \end{bmatrix} = 0 \quad (26)$$

where $S_{11} \in \mathfrak{R}^{(n-4) \times (n-4)}$, $S_{12} \in \mathfrak{R}^{(n-4) \times 4}$, $S_{21} \in \mathfrak{R}^{4 \times (n-4)}$, and $S_{22} \in \mathfrak{R}^{4 \times 4}$ are sub-matrices from the S matrix, with $S_{11}$ being made of the first (n−4) columns of the selected (n−4) rows of the S matrix, $S_{12}$ being made of the last 4 columns of the selected (n−4) rows of the S matrix, $S_{21}$ being made of the first (n−4) columns of the unselected 4 rows of the S matrix, $S_{22}$ being made of the last 4 columns of the unselected 4 rows of the S matrix; $\Delta N_1 \in \mathfrak{R}^{(n-4) \times 1}$ and $\Delta N_2 \in \mathfrak{R}^{4 \times 1}$ are sub-vectors of $\Delta N$, with $\Delta N_1$ being made of the first (n−4) rows of $\Delta N$, and $\Delta N_2$ being made of the last four rows of $\Delta N$; and $Q_{01} \in \mathfrak{R}^{(n-4) \times 1}$ and $Q_{02} \in \mathfrak{R}^{4 \times 1}$ are sub-vectors of $Q_0$, with $Q_1$ being made of the first (n−4) rows of $Q_0$, and $Q_2$ being made of the last four rows of $Q_0$. In one embodiment of the present invention, the (n−4) rows of the S matrix are selected such that the value of the diagonal element in each of the selected (n−4) rows is greater than the diagonal element in any of the 4 unselected rows. From Equation (24), we have $$S_{11}(\Delta N_1 + Q_{01}) + S_{12}(\Delta N_2 + Q_{02}) = 0$$

or, $$\Delta N_{1f} = -T(\Delta N_2 + Q_{02}) - Q_{01}, \quad (27)$$

and $$\Delta N_1 = \text{round}(\Delta N_{1f}), \quad (28)$$

where $$T = S_{11}^{-1} S_{12}. \quad (29)$$

A phase range residual sub-vector corresponding to $\Delta N_1$ is $$\Delta_{\Phi 1} = \Delta N_1 - \Delta N_{1f}. \quad (30)$$

Thus, the phase range residual vector corresponding to the integer ambiguity candidate set $\hat{N}=\hat{N}_0+\Delta N$ is $$\Delta_\Phi = S_1 \Delta_{\Phi 1}, \quad (31)$$

where, $$S_1 = \begin{bmatrix} S_{11} \\ S_{21} \end{bmatrix}. \quad (32)$$

So the candidate set vector $\hat{N}$ corresponding to the phase residual vector with the smallest norm value is the solution for the integer ambiguity vector N.

Since only integer ambiguities associated with a subset of the satellites 150 (FIG. 1) need to be searched for, the subset of the satellites corresponding to $\Delta N_2$ can be selected from the available satellites to minimize the measurement error (including carrier phase noise and multipath error) that affects the estimate of $\Delta N_1$. In one embodiment of the present invention, the subset of satellites is selected to minimize the value of each element of matrix $S_{11}^{-1}$ in (n−4)×(n−4) dimensions to decrease the measurement error effect for $\Delta N_1$ estimation. This is can be easily done because, like the S matrix, $S_{11}$ is always positively definite. So minimizing the value of each element of matrix $S_{11}^{-1}$ can be done by selecting the (n−4) satellites corresponding to the (n−4) rows of the S matrix having diagonal elements greater than the unselected four rows of the S matrix.

FIG. 3 shows a flow chart of an alternative embodiment of the present invention. This method 300 of resolving a set of GPS carrier phase integer ambiguities includes the steps of calculating 305 the S matrix, selecting 310 a subset of satellites from available satellites, splitting 315 the set of integer ambiguities into two subsets and spitting the S matrix into four sub-matrices according to the selection of the subset of satellites. A relationship between the two subsets of integer ambiguities is then derived 320 using the sub-matrices of the S matrix. A first subset of the integer ambiguities is selected 325 among a plurality of candidate subsets. For each of the plurality of candidate subsets, method 300 further includes the steps (330 to 340) of calculating 330 a second subset of integer ambiguities corresponding to the candidate subset using the derived relationship between the two subsets of integer ambiguities, and calculating 335 a residual vector corresponding to candidate subset. Method 300 then proceeds to find 345 the candidate subset corresponding to the residual vector having the smallest norm value as the solution for the first subset of integer ambiguities ($\Delta N_2$). The solution for the second subset of integer ambiguities ($\Delta N_1$) is the calculated second subset of integer ambiguities corresponding to the solution for the first subset of integer ambiguities.

Method 300, like method 200, can be carried out by executing a corresponding computer program 118A (FIG. 1), or set of computer procedures, using a microprocessor-based computer system or other computer system, such as system 100 as shown in FIG. 1. The computer program or procedures can be stored in a computer readable medium such as memory 110 in FIG. 1.

The search space reduction method of the present invention applies to resolving integer ambiguities for carrier phase obtained using both the $L_1$ and $L_2$ wavelengths, or the combined $L_1$ and $L_2$ wavelengths.

We claim:

1. A method for fast resolution of a set of integer ambiguities associated with GPS carrier phase measurements with respect to a plurality of satellites, the method comprising:

splitting the set of integer ambiguities into two subsets of integer ambiguities;

deriving a relationship between the two subsets of integer ambiguities; and for each of a plurality of candidate sets for a first subset of the two subsets of integer ambiguities, calculating a second subset of the two subsets of integer ambiguities and a residual value.

2. The method of claim 1, further comprising selecting a candidate set corresponding to a smallest residual value as a solution for the first subset of the integer ambiguities.

3. The method of claim 1, further comprising selecting the calculated second subset of integer ambiguities that corresponds to a smallest residual value as a solution for the second subset of integer ambiguities.

4. The method of claim 1 wherein splitting the set of integer ambiguities comprises:

calculating a residual sensitivity matrix associated with the at least one GPS receiver and the plurality of satellites;

selecting a number of linearly independent rows or columns of the residual sensitivity matrix; and selecting a subset of integer ambiguities corresponding to the selected number of rows or columns as the first subset of integer ambiguities.

5. The method of claim 4 wherein the number of independent rows or columns of the residual sensitivity matrix are selected to minimize measurement error.

6. The method of claim 5, wherein the number of linearly independent rows or column of the residual sensitivity matrix are selected such that each selected row or column has a diagonal element that is greater than the diagonal element in any of the unselected rows or columns.

7. A computer readable medium storing therein computer readable program instructions that, when executed by a computer, causes the computer to perform a method for fast resolution of a set of integer ambiguities associated with GPS carrier phase measurements with respect to a plurality of satellites, the instructions comprising:

instructions for splitting the set of integer ambiguities into two subsets of integer ambiguities;

instructions for deriving a relationship between the two subsets of integer ambiguities; and for each of a plurality of candidate sets for a first subset of the two subsets of integer ambiguities, instructions for calculating a second subset of the two subsets of integer ambiguities and a residual value.

8. The computer readable medium in claim 7, wherein the computer readable program instructions stored therein further comprise instructions for selecting a candidate set corresponding to a smallest residual value as a solution for the first subset of the integer ambiguities.

9. The computer readable medium in claim 7, wherein the computer readable program instructions stored therein further comprise instructions for selecting the calculated second subset of integer ambiguities that corresponds to a smallest residual value as a solution for the second subset of integer ambiguities.

10. The computer readable medium in claim 7, wherein the instructions for splitting the set of integer ambiguities comprise:

instructions for calculating a residual sensitivity matrix associated with the at least one GPS receiver and the plurality of satellites;

instructions for selecting a number of linearly independent rows or columns of the residual sensitivity matrix; and instructions for selecting a subset of integer ambiguities corresponding to the selected number of rows or columns as the first subset of integer ambiguities.

11. A method for fast resolution of a set of integer ambiguities associated with GPS carrier phase measurements with respect to a plurality of satellites, the measurements involving at least one GPS receiver, the method comprising:

calculating a residual sensitivity matrix associated with the at least one GPS receiver and the plurality of satellites;

deriving a relationship between two subsets of the set of integer ambiguities according to properties of the residual sensitivity matrix; and for each of a plurality of candidate sets for a first subset of the two subsets of integer ambiguities, calculating a second subset of the two subsets of integer ambiguities and a residual vector.

12. The method of claim 11, further comprising selecting a candidate set corresponding to the residual vector having a smallest norm value as a solution for the first subset of the integer ambiguities.

13. The method of claim 11, further comprising selecting the calculated second subset of integer ambiguities that corresponds to the residual vector having a smallest norm value as a solution for the second subset of integer ambiguities.

14. The method of claim 11 wherein deriving a relationship between two subsets of the set of integer ambiguities comprises:

determining a relationship between the set of integer ambiguities and the residual sensitivity matrix; and performing singular value decomposition of the residual sensitivity matrix.

15. The method of claim 14 wherein determining a relationship between the set of integer ambiguities and the residual sensitivity matrix includes minimizing a norm value of a phase range residual vector.

16. The method of claim 11 wherein deriving the relationship between the two subset of integer ambiguities comprises:

determining a relationship between the set of integer ambiguities and the residual sensitivity matrix; and splitting the residual sensitivity matrix into four submatrices.

17. The method of claim 16 wherein determining a relationship between the set of integer ambiguities and the residual sensitivity matrix include minimizing a norm value of a phase range residual vector.

18. The method of claim 16 wherein splitting the residual sensitivity matrix comprises rearranging the residual sensitivity matrix.

19. The method of claim 18 wherein rearranging the residual sensitivity matrix comprises:

selecting a number of linearly independent rows or columns of the residual sensitivity matrix; and rearranging the residual sensitivity matrix such that the selected number of linearly independent rows of columns are positioned in a rearranged residual sensitivity matrix as first rows or columns of the rearranged residual sensitivity matrix.

20. The method of claim 19, wherein the number of linearly independent rows or column of the residual sensitivity matrix are selected such that each selected row or column has a diagonal element that is greater than the diagonal element in any of the unselected rows or columns.

* * * * *

UNITED STATES PATENT AND TRADEMARK OFFICE
CERTIFICATE OF CORRECTION

PATENT NO.     : 6,753,810 B1                                      Page 1 of 1
DATED          : June 22, 2004
INVENTOR(S)    : Yang et al.

It is certified that error appears in the above-identified patent and that said Letters Patent is hereby corrected as shown below:

Column 14,
Line 24, delete the second occurrence of "of" and insert -- or --.

Signed and Sealed this

Twenty-first day of December, 2004

JON W. DUDAS
*Director of the United States Patent and Trademark Office*